(12) United States Patent
Kanazawa et al.

(10) Patent No.: US 8,968,850 B2
(45) Date of Patent: Mar. 3, 2015

(54) DRAW-IRONED STEEL CAN AND METHOD OF PRODUCING THE SAME

(75) Inventors: Seitaro Kanazawa, Yokohama (JP);
Shigeya Takahashi, Yokohama (JP);
Masashi Ikebuchi, Yokohama (JP);
Tomoko Haraguchi, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 358 days.

(21) Appl. No.: 13/318,572

(22) PCT Filed: May 24, 2010

(86) PCT No.: PCT/JP2010/058728
§ 371 (c)(1),
(2), (4) Date: Nov. 2, 2011

(87) PCT Pub. No.: WO2010/137550
PCT Pub. Date: Dec. 2, 2010

(65) Prior Publication Data
US 2012/0055837 A1  Mar. 8, 2012

(30) Foreign Application Priority Data

May 28, 2009  (JP) ................. 2009-128926

(51) Int. Cl.
| B32B 1/02 | (2006.01) |
| B32B 27/08 | (2006.01) |
| B32B 15/18 | (2006.01) |
| B32B 27/36 | (2006.01) |
| B32B 7/02 | (2006.01) |
| B32B 15/09 | (2006.01) |
| B32B 1/08 | (2006.01) |

(52) U.S. Cl.
CPC .............. *B32B 27/08* (2013.01); *B32B 15/18* (2013.01); *B32B 27/36* (2013.01); *B32B 7/02* (2013.01); *B32B 15/09* (2013.01); *B32B 2439/66* (2013.01)
USPC ....... 428/35.8; 428/34.1; 428/34.2; 428/35.7; 428/35.9; 428/36.9

(58) Field of Classification Search
USPC ............ 428/34.1, 34.2, 35.7, 35.9, 36.9, 35.8
See application file for complete search history.

(56) References Cited

U.S. PATENT DOCUMENTS

| 4,962,659 A | 10/1990 | Imazu et al. |
| 4,984,708 A | 1/1991 | Imazu et al. |
| 5,179,854 A * | 1/1993 | Matsui et al. .................... 72/349 |
| 6,565,937 B2 | 5/2003 | Sato et al. |
| 8,465,815 B2 * | 6/2013 | Kanazawa et al. ........... 428/35.6 |
| 2001/0031327 A1 * | 10/2001 | Sato et al. ..................... 428/35.8 |
| 2008/0261063 A1 | 10/2008 | Yamanaka et al. |

FOREIGN PATENT DOCUMENTS

| JP | 1-258822 A | 10/1989 |
| JP | 2001-246695 A | 9/2001 |
| JP | 2002-193255 A | 7/2002 |
| JP | 2005-335785 A | 12/2005 |
| JP | 2005-342911 A | 12/2005 |
| JP | 2005-342912 A | 12/2005 |
| JP | 2009-78303 A | 4/2009 |
| WO | 00/58087 A1 | 10/2000 |

* cited by examiner

*Primary Examiner* — Marc Patterson
(74) *Attorney, Agent, or Firm* — Sughrue Mion, PLLC

(57) ABSTRACT

A seamless can including a resin-coated steel plate. The can is a draw-ironed steel can having a resin coating formed on at least the inner surface of the can, wherein the resin coating on the inner surface of the can has a tensile strength of 160 to 360 MPa. Also disclosed is a method of producing the draw-ironed steel can.

2 Claims, No Drawings

DRAW-IRONED STEEL CAN AND METHOD OF PRODUCING THE SAME

TECHNICAL FIELD

This invention relates to a draw-ironed steel can and a method of producing the same. More specifically, the invention relates to a draw-ironed steel can excellent in corrosion resistance and productivity, and to a method of producing the same.

BACKGROUND ART

As a method of producing side seamless cans, a draw-ironing working has been known according to which a resin-coated metal plate obtained by coating a metal blank with an organic material is draw-ironed under dry conditions without using aqueous lubricant or coolant. However, if the resin-coated steel plate that uses a steel plate as a metal plate is subjected to the draw-ironing working, heat and iron powder are generated by the working often arousing a problem of defective forming. This method, therefore, is still not fully satisfactory from the standpoint of productivity. Besides, the defectively formed cans have a probability of developing corrosion occurring from the portions where the metal is exposed.

As a method of forming seamless cans, further, a stretch-draw forming has been placed in practical use to form seamless cans (patent document 1, etc.). According to this method, the resin-coated steel plate, too, can be formed under dry conditions without using aqueous lubricant, offering excellent productivity and environmental friendliness (patent document 1).

As a resin coating for a resin-coated steel plate used for the stretch-draw forming, there has, usually, been used a laminate of films of a polyethylene terephthalate or polyethylene terephthalate/isophthalate. For instance, there has been proposed a resin coating of a two-layer constitution comprising, as an upper layer, a polyethylene terephthalate/isophthalate containing 3 to 13 mol % of isophthalic acid and, as a lower layer, a polyethylene terephthalate/isophthalate containing 8 to 25 mol % of isophthalic acid (patent document 2).

PRIOR ART DOCUMENTS

Patent Documents

Patent document 1: JP-A-1-258822
Patent document 2: JP-A-2001-246695

OUTLINE OF THE INVENTION

Problems that the Invention is to Solve

In the stretch-draw forming, in general, the resin-coated steel plate is formed into a cup through the forming inclusive of the draw working followed by several steps of redrawing or bend-elongation, or in combination with ironing working to decrease the thickness of the cup wall and to increase the height of the can. In the stretch-draw forming, however, the drawing ratio is so large that the resin coating tends to develop wrinkles causing the resin coating to be cracked. At the portions where the coating is damaged, the metal may often be exposed apparently or latently.

Specifically, even if the metal of the resin-coated steel plate is not exposed, portions where the resin is weakly adhered permit water of the content to permeate through while the content is being preserved, triggering corrosion. It is, therefore, desired to more completely prevent the occurrence of metal exposure.

It is, therefore, an object of the present invention to provide a seamless can comprising a resin-coated steel plate, and featuring very excellent corrosion resistance and productivity.

Another object of the present invention is to provide a production method capable of economically providing seamless cans under dry conditions by using a resin-coated steel plate which may be coated with a general-purpose polyester resin and is coated with a resin of which the thickness can be decreased, effectively lowering the occurrence of metal exposure and maintaining good environmental friendliness.

Means for Solving the Problems

According to the present invention, there is provided a draw-ironed steel can having a resin coating formed on at least the inner surface of the can, wherein the resin coating on the inner surface of the can has a tensile strength of 160 to 360 MPa.

In the draw-ironed steel can of the present invention, it is desired that:
1. The resin coating on the inner surface of the can has a two-layer constitution comprising a surface layer of a highly crystalline polyester resin and a lower layer of a lowly crystalline polyester resin, the ratio of thicknesses of the surface layer and the lower layer being 1:5 to 9:1; and
2. The highly crystalline polyester resin is an ethylene terephthalate type polyester resin in which an isophthalic acid is copolymerized in an amount of 0 mol % to less than 3 mol %, and the lowly crystalline polyester resin is an ethylene terephthalate type polyester resin in which the isophthalic acid is copolymerized in an amount of 10 to 18 mol %.

According to the invention, further, there is provided a method of producing a draw-ironed steel can by draw-ironing a resin-coated steel plate having a resin coating formed on at least the inner surface of the can, setting the drawing ratio in a range of 1.1 to 2.6, the ironing ratio in a range of 50 to 80%, and using a punch of which the temperature is adjusted to be 20 to 50° C.

In the method of producing a draw-ironed steel can of the invention, it is desired that the resin-coated steel plate is a tin-free steel coated with resins of a two-layer constitution comprising a surface layer of a highly crystalline polyester resin and a lower layer of a lowly crystalline polyester resin, the ratio of thicknesses of the surface layer and the lower layer being in a range of 1:5 to 9:1.

Effects of the Invention

In the draw-ironed can of the invention, the resin coating on the inner surface of the can has a tensile strength in a range of 160 to 360 MPa, and has a large strength and a high hardness lowering the probability of metal exposure caused by iron powder and the like that generate during the forming or working. Therefore, the draw-ironed can has excellent barrier property against the corrosive components and excellent corrosion resistance on the can wall.

Further, the draw-ironed steel can of the invention features close adhesion of the resin coating during the working. Even when the container after worked is filled with a content and is aged, close adhesion of the coating and coverage are completely maintained, and excellent corrosion resistance is obtained in the double-seamed portion, too.

In the draw-ironed can of the invention, further, the tensile strength of the resin coating on the inner surface of the can is in the above range, and the resin coating has an increased strength. It is, therefore, allowed to decrease the thickness of the resin coating to be smaller than that of the prior art offering advantage in economy while contributing to enhancing productivity as a result of decreased probability of metal exposure.

The above effects of the invention will also become obvious from the results of Examples appearing later. That is, when the resin-coated steel plate of which the resin coating on the inner surface of the can has a tensile strength of less than 160 MPa, is draw-ironed, the obtained drawn-ironed steel can permits the metal to be exposed, and the productivity is lowered (Comparative Example 1). When the resin coating on the inner surface of the can has a tensile strength of larger than 360 MPa, on the other hand, the corrosion resistance becomes poor at the double-seamed portion (Comparative Example 2). When the same resin-coated steel plate as that of Example 8 is stretch-draw-formed, the metal is exposed, and corrosion resistance becomes poor on the can wall and at the double-seamed portion (Comparative Example 3). On the other hand, the draw-ironed steel cans of the invention give satisfactory results concerning all of metal exposure, corrosion resistance on the can wall, corrosion resistance at the double-seamed portion and close adhesion of the resin coating (Example 1 to 11).

The resin coating on the inner surface of the can of the invention may be of a single layer in addition to the above two-layer constitution. The resin coating of the single-layer constitution, however, more easily permits the metal to be exposed than the resin coating of the two-layer constitution of Examples 1 to 11. It is, therefore, obvious that the two-layer constitution is superior (Example 12).

To obtain the draw-ironed steel can having the above features, the resin-coated steel plate is draw-ironed at a drawing ratio in a range of 1.1 to 2.6 and at an ironing ratio in a range of 50 to 80% by using a punch of which the temperature is adjusted to be 20 to 50° C. Thus, the draw-ironed can of which the resin coating on the inner surface of the can has a tensile strength over the above range, can be obtained maintaining good productivity without permitting the metal to be exposed.

Namely, according to the method of producing a draw-ironed can of the invention, the drawing ratio is decreased and the ironing amount is increased to suppress the occurrence of conspicuous draw wrinkles caused by the draw working. It is, therefore, made possible to effectively suppress the occurrence of metal exposure caused by the draw wrinkles. Further, though the steel plate generates large amounts of heat during the ironing working, it is made possible to efficiently conduct the draw-ironing working while decreasing the occurrence of metal exposure without using aqueous lubricant or coolant owing to the use of the punch of which the temperature is adjusted and owing to the formation of the resin coating having a large strength on the surface of the steel plate that becomes the inner surface of the can.

MODE FOR CARRYING OUT THE INVENTION (Steel Plate)

In the invention, a surface-treated steel plate can be used as the steel plate that is to be coated with the resin. As the surface-treated steel plate, there can be used a cold-rolled steel plate that is annealed and is, thereafter, temper-rolled or secondarily cold-rolled followed by one or two or more kinds of surface treatments such as zinc plating, tin plating, nickel plating, electrolytic chromate treatment or chromate treatment.

In the present invention, the electrolytic chromate-treated steel plate (tin-free steel (hereinafter "TFS")) can be particularly preferably used from the standpoint of close adhesion of the coating and corrosion resistance. It is desired that the TFS has a metal chromium layer of 10 to 200 mg/m$^2$ and a chromium oxide hydrate layer of 1 to 50 mg/m$^2$ (as chromium).

As another example of the surface-treated steel plate, there can be used a tin plate plated with tin in an amount of 0.5 to 11.2 g/m$^2$. It is desired that the tin plate is treated with chromate, sodium bichromate or chromate and phosphate such that the amount of chromium is 1 to 30 mg/m$^2$.

The thickness of the surface-treated steel plate is in a range of, desirably, 100 to 300 μm from the standpoint of the strength of the obtained draw-ironed can and formability.

(Resin Coating)

As the resin coating to be applied onto the surface of the surface-treated steel plate that becomes the inner surface of the can, there can be used a thermoplastic resin if its tensile strength after forming the can lies in a range of 160 to 360 MPa and, specifically, 220 to 300 MPa. A polyester resin can be particularly preferably used.

The resin coating may comprise a single layer of polyester resin. In the present invention, however, it is particularly desired that the surface which becomes at least the inner surface of the can has the two-layer constitution comprising the surface layer of the highly crystalline polyester and the lower layer of the lowly crystalline polyester resin. Through the forming, therefore, the resin coating is imparted with oriented crystals. As a result, the resin coating on the inner surface of the seamless can possesses a large strength and a high hardness.

In the present invention, the highly crystalline polyester resin stands for a resin of which a minimum half-crystallization time is in a range of 10 to 100 seconds as measured by the following measuring method, and the lowly crystalline polyester resin stands for a resin of which a minimum half-crystallization time is in a range of 300 to 1100 seconds. These resins are both crystalline resins.

The minimum half-crystallization time is measured as described below.

The resin pellets are maintained at 30° C., heated by a differential scanning calorimeter (DSC) up to 290° C. at a temperature-elevating rate of 100° C./min., maintained at 290° C. for 3 minutes and are, thereafter, quickly cooled down to 0° C. at a cooling rate of 100° C./min. Thereafter, the temperature is elevated up to a predetermined temperature at a temperature-elevating rate of 100° C./min., and the predetermined temperature is maintained to obtain a "curve of amount of heat absorbed—maintained time". The time at which the amount of heat absorbed becomes a peak on the "curve of amount of heat absorbed—maintained time" is defined to be the "half-crystallization time". This is measured at a temperature between 100° C. and 200° C., and a value of the smallest "half-crystallization time" is regarded to be the "minimum half-crystallization time".

[Surface Layer]

The highly crystalline polyester that constitutes the surface layer of the resin coating on the surface that becomes the inner surface of the can, is a resin having the minimum half-crystallization time in a range of 10 to 100 seconds and is, particularly preferably, an ethylene terephthalate type polyester resin in which the isophthalic acid as a dicarboxylic acid component is copolymerized in an amount of 0 mol % to less than 3 mol %. If the amount of the isophthalic acid is more than the above range, a sufficiently large strength cannot be imparted to the resin coating, and the resistance against exposing metal and the corrosion resistance on the call wall may decrease. Besides, barrier effect cannot be sufficiently provided against adsorbing flavor components of the content.

In the present invention, the ethylene terephthalate type polyester resin stands for the one that contains the terephthalic acid as a carboxylic acid component in an amount of not less than 50 mol % and, specifically, not less than 70 mol %, and contains the ethylene glycol component as an alcohol component in an amount of not less than 50 mol % and, specifically, not less than 70 mol %.

So far as the above composition is satisfied, the ethylene terephthalate type polyester resin may, further, contain other copolymerizable components in small amounts. As the carboxylic acid components other than the isophthalic acid and terephthalic acid components, though not limited thereto only, there can be exemplified naphthalenedicarboxylic acid, p-β-oxyethoxybenzoic acid, biphenyl-4,4'-dicarboxylic acid, diphenoxyethane-4,4'-dicarboxylic acid, 5-sodiumsulfoisophthalic acid, hexahydroterephthalic acid, adipic acid, sebacic acid, trimellitic acid, pyromellitic acid, hemimellitic acid, 1,1,2,2-ethanetetracarboxylic acid, 1,1,2-ethanetricarboxylic acid, 1,3,5-pentanetricarboxylic acid, 1,2,3,4-cyclopentanetetracarboxylic acid, biphenyl-3,4,3',4'-tetracarboxylic acid and dimer acid.

As the alcohol component other than the ethylene glycol, on the other hand, there can be exemplified such alcohol components as propylene glycol, 1,4-butanediol, neopentyl glycol, 1,6-hexylene glycol, diethylene glycol, triethylene glycol, cyclohexane dimethanol, bisphenol A ethylene oxide adduct, glycerol, trimethylolpropane, pentaerythritol, dipentaerythritol and sorbitan.

The highly crystalline polyester resin must have a molecular weight in a range for forming a film, and desirably has an intrinsic viscosity (IV) of not smaller than 0.55 dL/g and, specifically, in a range of 0.6 to 1.0 dL/g as measured by using a phenol/tetrachloroethane mixed solvent as a solvent from the standpoint of barrier property against corrosive components and mechanical properties.

In the present invention, the polyester resin for constituting the surface layer of the resin coating is, preferably, a homopolyethylene terephthalate or a polyethylene terephthalate containing isophthalic acid in an amount of less than 3 mol % and, specifically, not more than 2 mol %.

Further, any of the surface layer, lower layer that will be described later or the single layer may be blended with known blending agents for films, such as anti-blocking agent like amorphous silica, pigment like titanium dioxide, antistatic agent, antioxidant or lubricant according to the recipe known per se.

[Lower Layer]

The lowly crystalline polyester resin for constituting the lower layer of the resin coating on the surface that becomes the inner surface of the can is a polyester resin having a minimum half-crystallization time in a range of 300 to 1100 seconds as described above, and is, specifically, an ethylene terephthalate type polyester resin in which the isophthalic acid is copolymerized as a dicarboxylic acid component in an amount of 10 to 18 mol % and, specifically, 13 to 17 mol %. If the content of the isophthalic acid is smaller than the above range, adhesion of the resin to the metal (steel plate) may become insufficient after the working. If the content of the isophthalic acid is larger than the above range, on the other hand, a sufficiently large strength cannot be imparted to the resin coating, the resistance against exposing the metal decreases, and the corrosion resistance decreases on the can wall.

Other copolymerizable components that can be used for the lowly crystalline polyester resin may be the same as those described above for the highly crystalline polyester resin.

The lowly crystalline polyester resin must have a molecular weight in a range for forming a film, and desirably has an intrinsic viscosity (IV) of not smaller than 0.55 dL/g and, specifically, in a range of 0.6 to 1.0 dL/g as measured by using a phenol/tetrachloroethane mixed solvent as a solvent.

[Single Layer]

In the present invention, as described above, the resin coating can be constituted as a single layer. In this case, the single layer of polyester resin must have both the strength and closely adhering property after having been worked. It is, therefore, desired to use an ethylene terephthalate type polyester resin containing the isophthalic acid in an amount in a range of 7 to 12 mol %. It is allowable, as a matter of course, to add a copolymerizable component in small amounts like the resin coating of the above two-layer constitution.

[Thicknesses of the Layers]

When the resin coating of the invention has a two-layer constitution comprising the surface layer of a highly crystalline polyester resin and the lower layer of a lowly crystalline polyester resin, it is desired that the thickness ratio of the surface layer and the lower layer is in a range of 1:5 to 9:1 and, specifically, 1:1 to 5:1.

If the thickness of the surface layer is larger than the above range, the strength of the resin becomes so large that the resin may be broken down at the time of double-seam working and the corrosion may occur in the double-seamed portion. If the thickness of the surface layer is smaller than the above range, on the other hand, the strength of the resin so decreases that the metal is easily exposed due to the draw-ironing and the corrosion resistance decreases on the can wall.

It is, further, desired that the thickness of the resin coating is in a range of 10 to 40 μm and, specifically, 14 to 35 μm either when it is of the two-layer constitution or is the single layer. If the thickness is larger than the above range, adhesiveness of the resin decreases after the working. If the thickness is smaller than the above range, on the other hand, the metal tends to be easily exposed due to the draw-ironing, and the corrosion resistance decreases on the can wall.

[Resin-Coated Steel Plate]

In the present invention, the resin coating of the above two-layer constitution or of the single layer is applied onto the surface of the steel plate that becomes the inner surface of the can; i.e., the resin coating can be applied onto the surface of the steel plate by a known laminating method. Desirably, the resin coating is formed in an unstretched and unoriented state by laminating a multi-layer cast film or by a co-extrusion coating method specifically from the standpoint of workability.

Lamination of the multi-layer cast film is such that the polyester resins for constituting the surface layer and the lower layer, e.g., PET/IA chips are introduced into separate extruders, heat-melted, extruded into sheets through dies, and cooled and solidified on a casting drum.

The co-extrusion coating, on the other hand, is conducted by using two extruders, feeding the PET/IA resins for forming the surface layer and the lower layer into the dies, and extruding them.

In the present invention, the laminated film is formed by laminating the multi-layer cast films or by the co-extrusion coating using no adhesive, attaining strong adhesion between the layers to improve the workability. The invention, however, does not prohibit the use of the adhesive but permits the use of a known primer for adhesion to the steel plate.

The primer for adhesion is a phenol epoxy type coating material which comprises a bisphenol type epoxy resin and a resole type phenolaldehyde resin derived from, for example, various phenols and formaldehyde, and which exhibits excellent adhesiveness to both the metal blank and the film. Specifically, the primer for adhesion is a coating material containing the phenol resin and the epoxy resin at a weight ratio of 50:50 to 1:99 and, specifically, 40:60 to 5:95. The adhesive primer layer is provided, usually, maintaining a thickness of 0.01 to 10 μm. The adhesive primer layer may be provided on the surface-treated steel plate in advance or may be provided on the polyester film.

The resin coating of the single layer, too, can be formed by laminating the cast film or by the extrusion coating method like in the case of the two-layer constitution.

The surface of the steel plate that becomes the outer surface of the can may be applied with a coating material that has usually been used for cans or with a resin coating that has heretofore been used for resin-coated metal plates.

The resin coating may be a single layer but is, desirably, a double-layer constitution comprising a surface layer of a polyethylene terephthalate/isophthalate containing isophthalic acid in amount of 7 to 14 mol % from the standpoint of close adhesion to the printing ink and the strength of the resin, and a lower layer of a polyethylene terephthalate/isophthalate containing isophthalic acid in an amount of 12 to 18 mol % from the standpoint of close adhesion of the resin. From the ornamental point of view, further, a pigment such as titanium dioxide may be added to the surface layer and the lower layer. Or a three-layer constitution may be employed including a layer containing, for example, much titanium dioxide between the surface layer and the lower layer.

(Method of Producing Draw-Ironed Can)

According to the invention, a draw-ironed can is formed by subjecting the above resin-coated steel plate to the known draw-ironing working. Prior to the draw-ironing working, it is desired that the surface of the resin-coated steel plate is applied with a wax type lubricant which is free of problems from the standpoint of food sanitation and which can be easily volatilized and removed by heating at about 200° C., such as glamour wax, fluidized paraffin, synthetic paraffin, white vaseline, palm oil, various natural waxes and polyethylene wax, enabling the draw-ironing working to be efficiently conducted under dry conditions.

The resin-coated steel plate applied with the wax type lubricant is punched by using a cupping press to obtain a blank which is draw-worked to form a drawn cup.

In the invention, it is desired that the drawing ratio $R_D$ defined by the following formula (1) as a total is in a range of 1.1 to 2.6 and, specifically, in a range of 2.0 to 2.6. If the drawing ratio is higher than the above range, the draw wrinkles so increase that cracks may occur in the resin coating and the metal may be exposed.

$$R_D = D/d \quad (1)$$

wherein D is a diameter of the blank, and d is a diameter of the can wall.

Next, the drawn cup is subjected to the redrawing and to one or a plurality of stages of ironing working. Here, in the invention, it is desired that the temperature of the forming punch has been adjusted to be 20 to 50° C.

If the temperature of the punch is lower than the above range, the wax type lubricant applied to the resin-coating steel plate fails to exhibit lubricating property to a sufficient degree, cracks may occur in the resin coating as the punch is not smoothly removed from the seamless can, and the metal may be exposed. If the temperature of the punch is higher than the above range, on the other hand, the temperature may approach the glass transition temperature of the polyester resin whereby the resin sticks to the punch causing defective forming (breakage of wall). Besides, the surface of the resin is coarsened accompanying the forming, and the metal may be exposed.

In the invention, it is desired that the ironing ratio R represented by the following formula (2) is in a range of 50 to 80%. If the ironing ratio is lower than the above range, the thickness cannot be sufficiently decreased, which is not fully satisfactory from the economical point of view. If the ironing ratio is higher the above range, on the other hand, the metal may be exposed at the limit of forming resin or the metal may be exposed during the double-seam working.

$$R = (tb - tw)/tb \quad (2)$$

wherein tb is a thickness of the metal blank of the surface-treated steel plate, and tw is a thickness of the metal portion of the draw-ironed can from where the resin coating has been removed.

The obtained draw-ironed can is subjected to the doming at the bottom portion thereof and to the trimming at the opening edge thereof according to the customary manner. As required, the heat treatment is conducted to remove residual strain of the resin coating. Thereafter, the printing ink and the finishing varnish are applied onto the outer surface of the can wall followed by baking, necking and flanging to thereby complete the draw-ironed steel can (seamless can) of the invention.

EXAMPLES

<Minimum Half-Crystallization Times of Resin Pellets on the Inner Surface>

Described below are minimum half-crystallization times of the resins on the inner surfaces used in Examples and Comparative Examples.

(1) Pellets of homo PET resin (0 mol % of isophthalic acid) (IA0 in Table 1): 38 seconds
(2) Pellets of PET/IA copolymerized resin containing 2 mol % of isophthalic acid (IA2 in Table 1): 70 seconds
(3) Pellets of PET/IA copolymerized resin containing 2.5 mol % of isophthalic acid (IA2.5 in Table 1): 75 seconds
(4) Pellets of PET/IA copolymerized resin containing 5 mol % of isophthalic acid (IA5 in Table 1): 113 seconds
(5) Pellets of PET/IA copolymerized resin containing 10 mol % of isophthalic acid (IA10 in Table 1): 384 seconds
(6) Pellets of PET/IA copolymerized resin containing 15 mol % of isophthalic acid (IA15 in Table 1): 642 seconds
(7) Pellets of PET/IA copolymerized resin containing 18 mol % of isophthalic acid (IA18 in Table 1): 980 seconds <Evaluating the Percentage Occurrence of Metal Exposed Can>

200 Seamless cans that were obtained were measured for their metal exposure by applying electric current thereto by using an enamel rater and were evaluated for their occupation ratios of current values of not smaller than 0.01 mA. The measuring conditions of the enamel rater were such that a current value was measured in 4 seconds after the start of applying a voltage of 6 V. The electrolyte consisted of an aqueous solution containing 1% by weight of sodium chloride to which a surfactant was added in an amount of 0.02% by weight. The evaluation was on the following basis. ◯ and Δ represent permissible ranges.

◯: Occupation ratio is not more than 1%.

Δ: Occupation ratio is more than 1% but is not more than 2%.

x: Occupation ratio is more than 2%. <Evaluating the Corrosion Resistance of the Can Wall>

100 Seamless cans that were obtained were filled with an aqueous solution containing 0.4% by weight of citric acid at room temperature, were double-seamed and were stored at 37° C. for 3 months. Thereafter, the cans were opened and were observed with the eye for their corroded state on the inner surfaces of the can walls. The evaluation was on the following basis. ○ and Δ represent permissible ranges.

○: Corrosion spots were observed in none of the cans.

Δ: Corrosion spots were observed in one can but on a level free of problem in practice.

x: Corrosion spots were obviously observed in two cans. <Evaluating the Corrosion Resistance of the Double-Seamed Portion>

50 Seamless cans that were obtained were filled with an aqueous solution containing 0.4% by weight of citric acid at room temperature, were double-seamed and were stored at 37° C. for 3 months. Thereafter, the can lids were removed and were observed with the eye for their corroded state at the double-seamed portions. Among the 50 cans, the cans that corroded to the greatest degree at the double-seamed portions were evaluated on the following basis. ○ and Δ represent permissible ranges.

○: There was no corrosion.

Δ: Corrosion occurred slightly but on a permissible level.

x: Obviously corroded. <Evaluating the Close Adhesion of the Resin>

50 Seamless cans that were obtained were observed with the eye for the resin on the inner surfaces at the flange end portions thereof to evaluate the close adhesion between the resin and the metal. Among the 50 cans, the cans that exhibited the resin peeling to the greatest degree were evaluated on the following basis. ○ and Δ represent permissible ranges.

○: There was no peeling.

Δ: Peeled slightly but on a permissible level.

x: Obviously peeled. <Total Evaluation>

Percentage occurrence of metal exposed can, corrosion resistance of the can wall, corrosion resistance of the double-seamed portion and close adhesion of the resin were totally evaluated on the following basis. ○ and Δ represent permissible ranges.

○: All items were evaluated to be ○.

Δ: At least any one item was evaluated to be Δ but there was no item that was evaluated to be x.

x: At least any one item was evaluated to be x. <Measuring the Tensile Strength of the Film on the Can Wall>

To measure the tensile strength of the film on the can wall portion, the side wall of the obtained seamless can was dipped in the hydrochloric acid to remove the metal portion and thereby to isolate the film on the inner surface of the can wall. The film was cut into a width of 5 mm and a length of 50 mm to obtain a tension test piece. The tension test piece was so formed that the direction of tension was in the axial direction of the can (direction of height of the can) and a position where the film had the smallest thickness on the side wall of the can (position 60 mm over the can bottom of the 330-ml can of Examples) was at the central portion of the test piece. The gauge length was 20 mm and the tension test was conducted at a rate of 10 mm/min.

Example 1

Preparation of the Resin-Coated Steel Plate

The surface-treated steel plate was a TFS substrate of a thickness of 0.19 mm (amount of metal chromium was 120 mg/m$^2$, chromium in the chromium oxide hydrate was 15 mg/m$^2$). The unstretched film comprising the surface layer of a polyethylene terepthalate/isophthalate (PET/IA) copolymerized resin containing 2 mol % of isophthalic acid and the lower layer of the PET/IA copolymerized resin containing 15 mol % of isophthalic acid (thickness of the whole film of 28 μm) was applied onto the surface of the substrate that became the inner surface of the can, and the unstretched film of the PET/IA copolymerized resin containing 10 mol % of isophthalic acid and having a thickness of 16 μm was applied onto the surface of the substrate that became the outer surface of the can followed by simultaneously heat-laminating the films at a metal plate temperature of 250° C. Next, the wax type lubricant was applied thereon to prepare a resin-coated steel plate.

In forming the unstretched film on the inner surface of the can, the pellets of copolymerized resin containing 2 mol % of isophthalic acid were fed into the hopper of an extruder so as to serve as the resin for forming the surface layer, and the copolymerized resin containing 15 mol % of isophthalic acid was fed into the hopper of another extruder so as to serve as the resin for forming the lower layer. The resins were coextruded through a T-die. Immediately after extruded, the resins were cooled with cooling rolls to prepare an unstretched, unoriented and amorphous two-layer resin film having a thickness of 28 μm and a thickness ratio of the surface layer of 0.80. In forming the unstretched film on the outer surface of the can, an unstretched, unoriented and amorphous single-layer resin film was prepared in the same manner as that of the resins on the inner surface of the can but forming the PET/IA copolymerized resin single layer containing 10 mol % of isophthalic acid having a thickness of 16 μm.

Preparation of the Resin-Coated Seamless Can

The obtained resin-coated steel plate was punched into the shape of a disk which was then subjected to the draw-ironing forming under the working conditions (drawing ratio, ironing ratio, punch temperature at the time of ironing working) as shown in Table 1, and the opening edge portion was trimmed, and the cup was heated to remove the strain caused by the forming of resin. Thereafter, the printing ink and the finishing varnish were applied onto the outer surface of the can wall, followed by baking in an oven. Thereafter, the can was subjected to the necking and the flanging to prepare a resin-coated seamless can having a can diameter of 66 mm, a can height of 115 mm and a capacity of 330 ml. The temperature of the punch at the time of ironing working was represented by the temperature of the temperature-adjusting water flown into the punch.

The obtained seamless cans were evaluated for their percentage occurrence of metal exposure, corrosion resistance of the can wall, corrosion resistance of the double-seamed portion and close adhesion of the resin. Specifications of the resins on the inner surface of the obtained seamless cans, forming conditions and the evaluated results were as shown in Table 1.

Example 2

A resin-coated seamless can was prepared in the same manner as in Example 1 but using a PET/IA copolymerized resin containing 2.5 mol % of isophthalic acid as the resin for forming the surface layer on the inner surface and setting the ratio of the thickness of the surface layer to be 0.20 in the resin on the inner surface, and was evaluated in the same manner as in Example 1. Specifications of the resins on the inner surface of the obtained seamless cans, forming conditions and the evaluated results were as shown in Table 1.

Example 3

A resin-coated seamless can was prepared in the same manner as in Example 1 but using a homo PET as the resin for forming the surface layer on the inner surface and setting the ratio of the thickness of the surface layer to be 0.90 in the resin on the inner surface, and was evaluated in the same manner as in Example 1. Specifications of the resins on the inner surface of the obtained seamless cans, forming conditions and the evaluated results were as shown in Table 1.

Example 4

A resin-coated seamless can was prepared in the same manner as in Example 1 but using the homo PET as the resin for forming the surface layer on the inner surface and setting the ratio of the thickness of the surface layer to be 0.20 in the resin on the inner surface, and was evaluated in the same manner as in Example 1. Specifications of the resins on the inner surface of the obtained seamless cans, forming conditions and the evaluated results were as shown in Table 1.

Example 5

A resin-coated seamless can was prepared in the same manner as in Example 1 but using a PET/IA copolymerized resin containing 10 mol % of isophthalic acid as the resin for forming the lower layer on the inner surface, and was evaluated in the same manner as in Example 1. Specifications of the resins on the inner surface of the obtained seamless cans, forming conditions and the evaluated results were as shown in Table 1.

Example 6

A resin-coated seamless can was prepared in the same manner as in Example 1 but using a PET/IA copolymerized resin containing 18 mol % of isophthalic acid as the resin for forming the lower layer on the inner surface and setting the ratio of thickness of the surface layer to be 0.25 in the resin on the inner surface, and was evaluated in the same manner as in Example 1. Specifications of the resins on the inner surface of the obtained seamless cans, forming conditions and the evaluated results were as shown in Table 1.

Example 7

A resin-coated seamless can was prepared in the same manner as in Example 1 but setting the ratio of thickness of the surface layer to be 0.67 in the resin on the inner surface, and was evaluated in the same manner as in Example 1. Specifications of the resins on the inner surface of the obtained seamless cans, forming conditions and the evaluated results were as shown in Table 1.

Example 8

A resin-coated seamless can was prepared in the same manner as in Example 1 but setting the ratio of thickness of the surface layer to be 0.20 in the resin on the inner surface and setting the temperature of the punch at the time of ironing working to be 20° C., and was evaluated in the same manner as in Example 1. Specifications of the resins on the inner surface of the obtained seamless cans, forming conditions and the evaluated results were as shown in Table 1.

Example 9

A resin-coated seamless can was prepared in the same manner as in Example 1 but setting the ratio of thickness of the surface layer to be 0.20 in the resin on the inner surface and setting the temperature of the punch at the time of ironing working to be 50° C., and was evaluated in the same manner as in Example 1. Specifications of the resins on the inner surface of the obtained seamless cans, forming conditions and the evaluated results were as shown in Table 1.

Example 10

A resin-coated seamless can was prepared in the same manner as in Example 1 but setting the drawing ratio to be 2.1, the can diameter to be 66 mm, the can height to be 102 mm and the capacity to be 280 ml, and was evaluated in the same manner as in Example 1. Specifications of the resins on the inner surface of the obtained seamless cans, forming conditions and the evaluated results were as shown in Table 1.

Example 11

A resin-coated seamless can was prepared in the same manner as in Example 1 but setting the ratio of thickness of the surface layer to be 0.17 in the resin on the inner surface, the drawing ratio to be 2.6, the ironing ratio to be 63%, the can diameter to be 53 mm, the can height to be 133 mm and the capacity to be 250 ml, and was evaluated in the same manner as in Example 1. Specifications of the resins on the inner surface of the obtained seamless cans, forming conditions and the evaluated results were as shown in Table 1.

Example 12

A resin-coated seamless can was prepared in the same manner as in Example 1 but using a single layer of the PET/IA copolymerized resin containing 10 mol % of isophthalic acid as the resin on the inner surface, was evaluated in the same manner as in Example 1. Specifications of the resins on the inner surface of the obtained seamless cans, forming conditions and the evaluated results were as shown in Table 1.

Comparative Example 1

A resin-coated seamless can was prepared in the same manner as in Example 1 but using a PET/IA copolymerized resin containing 5 mol % of isophthalic acid as the resin for forming the surface layer on the inner surface and setting the ratio of thickness of the surface layer to be 0.17 in the resin on the inner surface, and was evaluated in the same manner as in Example 1. Specifications of the resins on the inner surface of the obtained seamless cans, forming conditions and the evaluated results were as shown in Table 1.

Comparative Example 2

A resin-coated seamless can was prepared in the same manner as in Example 1 but using the homo PET as the resin for forming the surface layer on the inner surface, using the PET/IA copolymerized resin containing 10 mol % of isophthalic acid as the resin for forming the lower layer on the inner surface and setting the ratio of thickness of the surface layer to be 0.90 in the resin on the inner surface, and was evaluated in the same manner as in Example 1. Specifications of the resins on the inner surface of the obtained seamless cans, forming conditions and the evaluated results were as shown in Table 1.

Comparative Example 3

A resin-coated seamless can was prepared in the same manner as in Example 1 but setting the ratio of thickness of the surface layer to be 0.20 in the resin on the inner surface, employing the stretch-draw forming as the forming method, setting the drawing ratio to be 2.7 and the ironing ratio to be 0%, and was evaluated in the same manner as in Example 1. Specifications of the resins on the inner surface of the obtained seamless cans, forming conditions and the evaluated results were as shown in Table 1.

lent adhesion of the resin after the working and excellent corrosion resistance at the double-seamed portion, too. The method of producing the draw-ironed steel can of the invention is capable of producing the draw-ironed steel cans suppressing the occurrence of metal exposure offering advantage from the standpoint of environment, productivity and economy.

Therefore, the draw-ironed steel cans of the invention can be favorably used not only as beverage-containing cans that are to be mass-produced but also as cans to be filled with corrosive contents.

The invention claimed is:

1. A draw-ironed steel can obtained by draw-ironing a resin-coated steel plate having an unstretched and unoriented resin coating formed on at least the surface that becomes the inner surface of the can, wherein

TABLE 1

| | | Resins on inner surface | | | Forming conditions | | | |
| --- | --- | --- | --- | --- | --- | --- | --- | --- |
| | | Kind | | Layer ratio | Tensile | | Punch | Ironing |
| | Capacity of can | Surface layer | Lower layer | (Surface layer ratio) | strength (MPa) | Forming method | temp. (° C.) | Drawing ratio | ratio (%) |
| Ex. 1 | 330 ml | IA2 | IA15 | 4:1 (0.80) | 260 | D&I | 30 | 2.3 | 62 |
| Ex. 2 | 330 ml | IA2.5 | IA15 | 1:4 (0.20) | 160 | D&I | 30 | 2.3 | 62 |
| Ex. 3 | 330 ml | IA0 | IA15 | 9:1 (0.90) | 360 | D&I | 30 | 2.3 | 62 |
| Ex. 4 | 330 ml | IA0 | IA15 | 1:4 (0.20) | 170 | D&I | 30 | 2.3 | 62 |
| Ex. 5 | 330 ml | IA2 | IA10 | 4:1 (0.80) | 300 | D&I | 30 | 2.3 | 62 |
| Ex. 6 | 330 ml | IA2 | IA18 | 1:3 (0.25) | 160 | D&I | 30 | 2.3 | 62 |
| Ex. 7 | 330 ml | IA2 | IA15 | 2:1 (0.67) | 240 | D&I | 30 | 2.3 | 62 |
| Ex. 8 | 330 ml | IA2 | IA15 | 1:4 (0.20) | 190 | D&I | 20 | 2.3 | 62 |
| Ex. 9 | 330 ml | IA2 | IA15 | 1:4 (0.20) | 160 | D&I | 50 | 2.3 | 62 |
| Ex. 10 | 280 ml | IA2 | IA15 | 4:1 (0.80) | 260 | D&I | 30 | 2.1 | 62 |
| Ex. 11 | 250 ml | IA2 | IA15 | 1:5 (0.17) | 160 | D&I | 30 | 2.6 | 63 |
| Ex. 12 | 330 ml | | IA10 single layer | | 210 | D&I | 30 | 2.3 | 62 |
| Comp. Ex. 1 | 330 ml | IA5 | IA15 | 1:5 (0.17) | 150 | D&I | 30 | 2.3 | 62 |
| Comp. Ex. 2 | 330 ml | IA0 | IA10 | 9:1 (0.90) | 370 | D&I | 30 | 2.3 | 62 |
| Comp. Ex. 3 | 330 ml | IA2 | IA15 | 1:4 (0.20) | 170 | SD | 30 | 2.7 | 0 |

Forming method D&I: Draw-ironing forming
Forming method SD: Stretch-draw forming

| | Evaluation | | | | |
| --- | --- | --- | --- | --- | --- |
| | Percentage of metal exposed can | Corrosion resistance of can wall | Corrosion resistance of double-seamed portion | Close adhesion of resin | Total evaluation |
| Ex. 1 | ○ (0.3%) | ○ | ○ | ○ | ○ |
| Ex. 2 | Δ (1.2%) | ○ | ○ | ○ | Δ |
| Ex. 3 | ○ (0.5%) | ○ | Δ | ○ | Δ |
| Ex. 4 | ○ (1.0%) | ○ | ○ | ○ | ○ |
| Ex. 5 | ○ (0.5%) | ○ | ○ | Δ | Δ |
| Ex. 6 | Δ (1.3%) | ○ | ○ | ○ | Δ |
| Ex. 7 | ○ (0.5%) | ○ | ○ | ○ | ○ |
| Ex. 8 | Δ (1.1%) | ○ | ○ | ○ | Δ |
| Ex. 9 | Δ (1.2%) | ○ | ○ | ○ | Δ |
| Ex. 10 | ○ (0.3%) | ○ | ○ | ○ | ○ |
| Ex. 11 | Δ (1.5%) | Δ | ○ | ○ | Δ |
| Ex. 12 | Δ (1.2%) | ○ | ○ | ○ | Δ |
| Comp. Ex. 1 | x (2.2%) | Δ | ○ | ○ | x |
| Comp. Ex. 2 | ○ (0.5%) | ○ | x | ○ | x |
| Comp. Ex. 3 | x (3.0%) | x | x | ○ | x |

INDUSTRIAL APPLICABILITY

The draw-ironed steel can of the present invention has excellent corrosion resistance on the can wall without permitting the metal to be exposed and, further, features very excelthe resin coating of the draw-ironed can has a two-layer constitution comprising a surface layer of a highly crystalline polyester resin and a lower layer of a lowly crystalline polyester resin, the ratio of thicknesses of the surface layer and the lower layer being 1:1 to 4:1;

the highly crystalline polyester resin is an ethylene terephthalate type polyester resin in which an isophthalic acid is copolymerized in an amount of 0 mol % and less than 3 mol %, and the lowly crystalline polyester resin is an ethylene terephthalate type polyester resin in which the isophthalic acid is copolymerized in an amount of 13 to 17 mol %; and the resin coating on the inner surface of the can has a tensile strength of 240 to 300 MPa.

2. A method of producing a draw-ironed steel can by draw-ironing a resin-coated steel plate having an unstretched and unoriented resin coating formed on at least the surface that becomes the inner surface of the can, the resin-coating having a two-layer constitution comprising a surface layer of a highly crystalline polyester resin and a lower layer of a lowly crystalline polyester resin, the ratio of thicknesses of the surface layer and the lower layer being 1:1 to 4:1, the highly crystalline polyester resin being an ethylene terephthalate type polyester resin in which an isophthalic acid is copolymerized in an amount of larger than 0 mol % and less than 3 mol %, and the lowly crystalline polyester resin being an ethylene terephthalate type polyester resin in which the isophthalic acid is copolymerized in an amount of 13 to 17 mol %; and by setting the drawing ratio in a range of 1.1 to 2.6, the ironing ratio in a range of 50 to 80%, and using a punch of which the temperature is adjusted to be 20 to 50° C.

\* \* \* \* \*